United States Patent [19]
Jannot et al.

[11] 3,848,697
[45] Nov. 19, 1974

[54] ACOUSTIC DAMPING AND COOLING OF TURBOJET EXHAUST DUCTS

[75] Inventors: Michel Rene Jannot, Sceaux; Robert Guillaume Vaillant, Paris; Serge Yvan Dzalba-Lyndis, Villejuif, all of France

[73] Assignee: Societe Nationale Industrielle Aerospatiale, Paris, France

[22] Filed: July 3, 1973

[21] Appl. No.: 376,214

[30] Foreign Application Priority Data
July 4, 1972 France .............................. 72.24082

[52] U.S. Cl...... 181/33 HB, 181/33 HC, 239/127.3, 239/265.11
[51] Int. Cl............................................. B64d 33/06
[58] Field of Search......... 181/33 H, 33 HB, 33 HC; 239/265.11, 265.13, 265.17, 127.1, 127.3; 60/39.72 P, 261, 262, 271

[56] References Cited
UNITED STATES PATENTS

| | | | |
|---|---|---|---|
| 2,794,319 | 6/1957 | Stockdale | 60/261 |
| 2,826,261 | 3/1958 | Eckel | 181/33 HB UX |
| 2,930,195 | 3/1960 | Blackman et al. | 181/33 HB UX |
| 3,041,836 | 7/1962 | Truman et al. | 181/33 HB UX |
| 3,599,749 | 8/1971 | Millman | 181/33 HC |

Primary Examiner—Richard B. Wilkinson
Assistant Examiner—John F. Gonzales
Attorney, Agent, or Firm—Karl W. Flocks

[57] ABSTRACT

The invention proposes a solution to the problem of noise damping and cooling in high-temperature zones in turbojet exhaust ducts.

A material which consists basically of one or more single corrugated cores having a standardized profile and clearly defined characteristics in regard both to its dimensions and its flexural properties lengthwise of the corrugations, is associated in accordance with this invention to other materials for the purpose of constituting a plurality of chambers forming a separation duct between the hot and cool flows through a turbojet.

These chambers, termed noise attenuating chambers when they lie on the side of the hot flow, or cooling chambers when they lie on the side of the cool flow, are arranged substantially longitudinally in relation to the direction of said flows, thereby to minimize the loss of thrust caused by wall friction.

12 Claims, 48 Drawing Figures

ACOUSTIC DAMPING AND COOLING OF TURBOJET EXHAUST DUCTS

The noise generated by turbojets in general are of three kinds: noise in the upstream section comprising the air intake and the low-pressure compressor; noise in the central section comprising the high-pressure compressor, the combustion chamber and the turbine; and noise in the downstream section comprising the exhaust duct and possibly also the afterburner section and the nozzle governing the discharge of the jet into the atmosphere.

Although all these components generate noise in characteristic frequency bands directly related either to moving parts like the compressor blades, for example, or to the motions of fluids rubbing against the walls, all these noises merge within the exhaust duct, where there is accordingly to be found a wide spectrum of noises typical of a specific turbojet, such as a single-flow of by-pass flow turbojet.

In addition, these engine components are located in temperature zones which differ greatly from one another and which range from the low temperatures prevailing in the region of the air intake to the high temperatures of close on 1,300° to 1,600°K which may exist in the exhaust duct.

The treatment of noise in the relatively cool sections of turbojets has been the subject of numerous studies, a case in point being NASA Report CR 1373 of September 1969 entitled "Analytical and Experimental Studies for Predicting Noise Attenuation in Acoustically Treated Ducts for Turbofan Engines."

An examination of this document shows that whereas noise attenuation in turbojet sections not subjected to high temperatures can be achieved with comparatively simple means, this is not so if it is desired to acoustically treat the hot areas of the exhaust duct, where the high thermal stresses resulting from the temperature differentials between the hot and cool flows require the use of more complex materials capable alike of high resistance to high temperature acoustic fatigue and of effective noise damping over a fairly wide frequency band.

It may be useful to point out that said hot and cool flows originate respectively from the axial area of the turbojet where afterburning takes place and, in the case of the cooler flow, either from a zone close to the low-pressure compressor, from the peripheral zone of the turbine, or from an offtake of external air.

The present invention proposes a solution to the problem of noise damping in such high-temperature zones, on the basis of a newly developed semi-finished material which is a sandwich structure with a corrugated core produced by the Applicant.

This material, which consists basically of one or more single corrugated cores having a standardized profile and clearly defined characteristics in regard both to its dimensions and its flexural properties lengthwise of the corrugations, is associated in accordance with this invention to other materials for the purpose of constituting a plurality of chambers forming a separation duct between the hot and cool flows through a turbojet.

These chambers, termed noise attenuating chambers when they lie on the side of the hot flow, or cooling chambers when they lie on the side of the cool flow, are arranged substantially longitudinally in relation to the direction of said flows, thereby to minimize the loss of thrust caused by wall friction.

It goes without saying that the terms "hot flow" and "cool flow" must be broadly interpreted in regard to the temperature differential across the inner and outer surfaces of the exhaust duct, which differential may sometimes be small, sometimes very large.

The invention will be more clearly understood from the description which follows, with reference to the accompanying non-limitative examplary drawings, of various possible embodiments involving an association of corrugated-core elements with complementary elements whereby to form noise attenuation and cooling chambers for the exhaust duct of a variety of turbojet engines.

Figure 8:
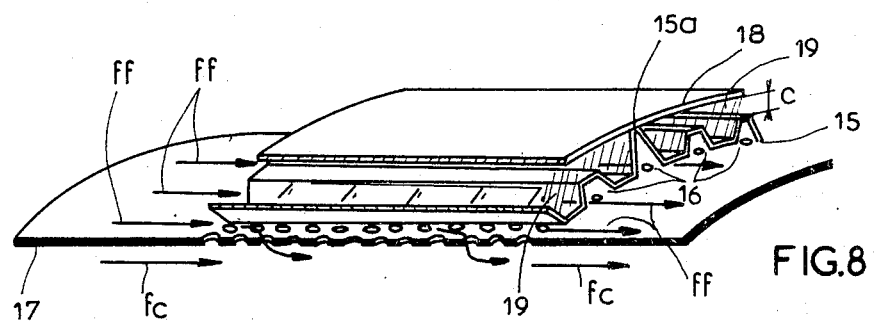
Figure 15:
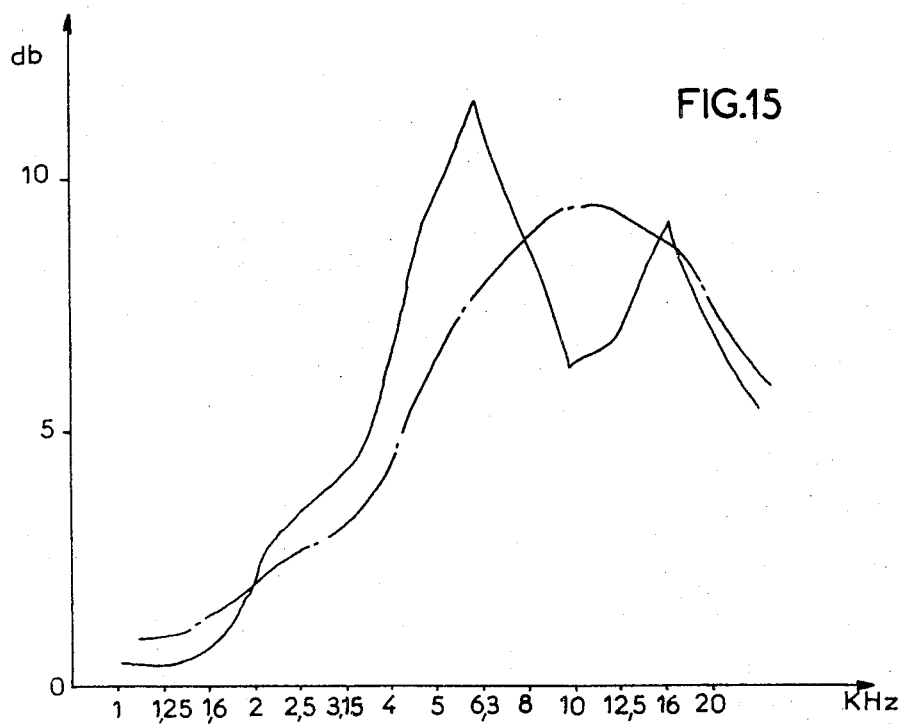
Figure 16:
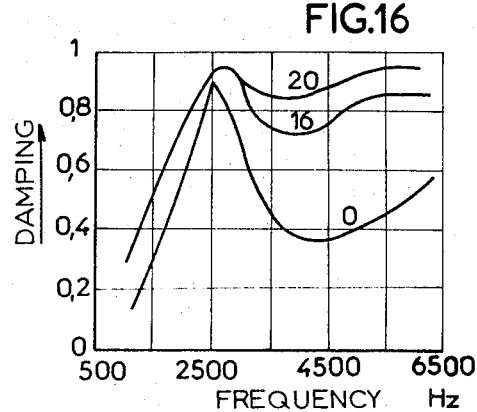
Figure 16:
Figure 16:
Figure 16:
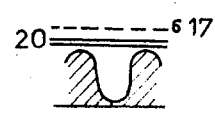
Figure 17:
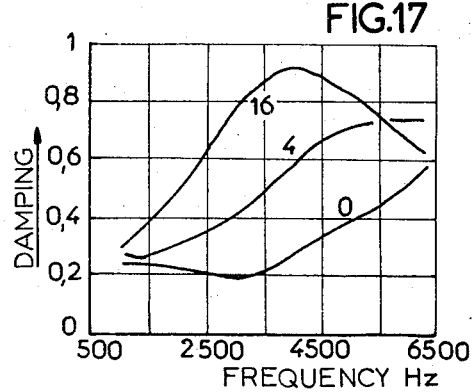
Figure 17:
Figure 17:
Figure 17:
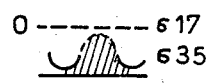
Figure 18:
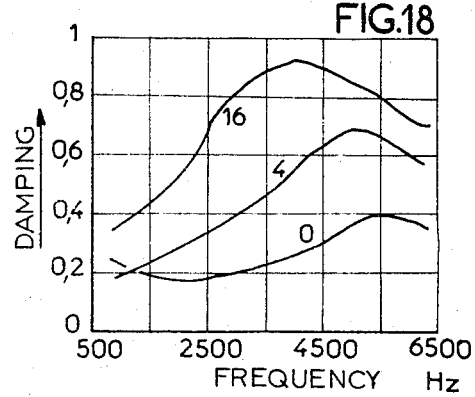
Figure 18:
Figure 18:
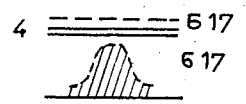
Figure 18:
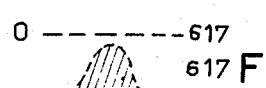
Figure 19:
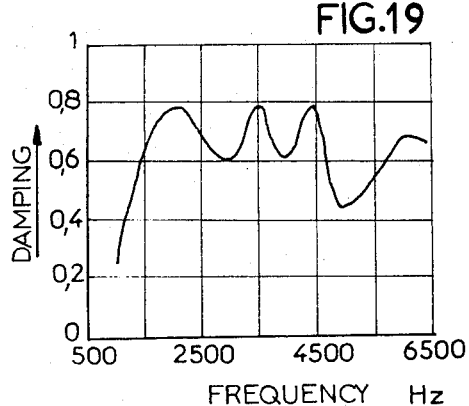
Figure 19A:
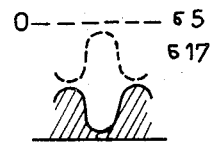
Figure 20:
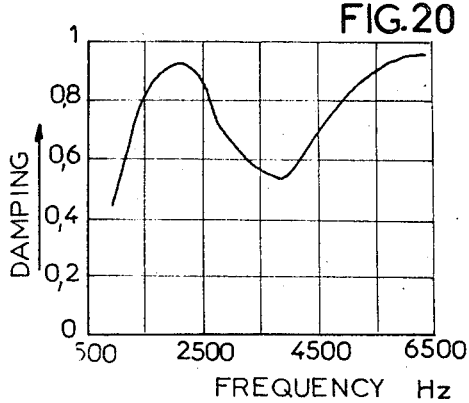
Figure 20A:
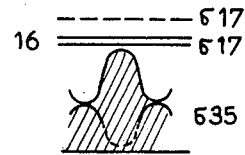
Figure 21:
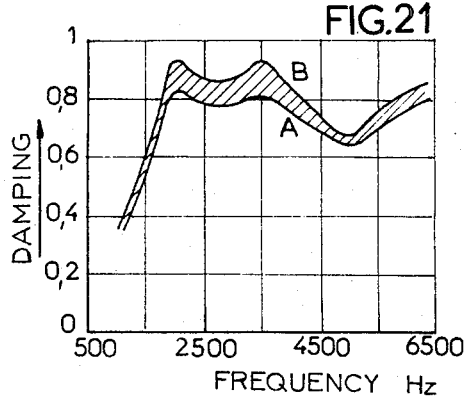
Figure 21A:
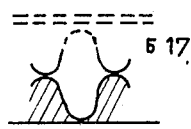
Figure 21B:
Figure 22:
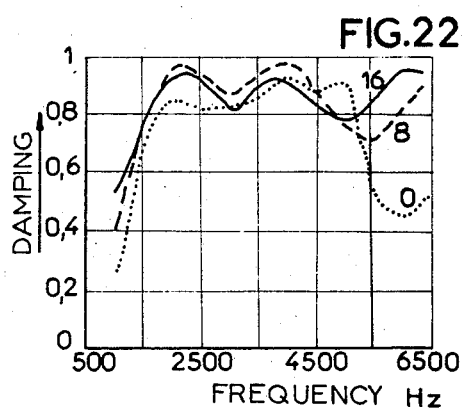
Figures 22A, 22B, 22C:
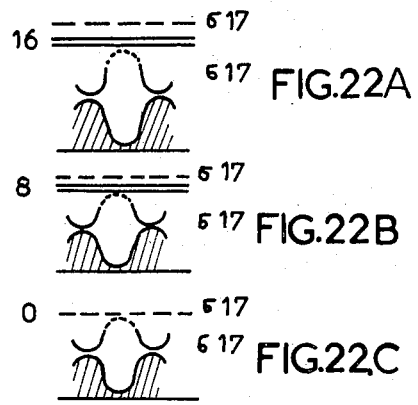
Figure 23:
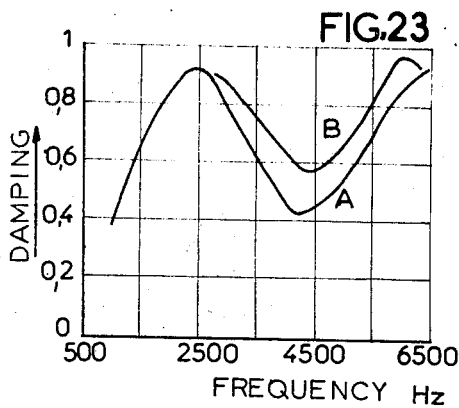
Figure 23A:
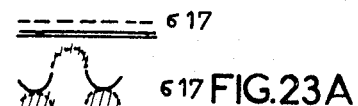
Figure 23B:
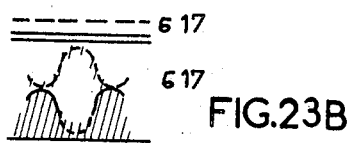
Figure 24:
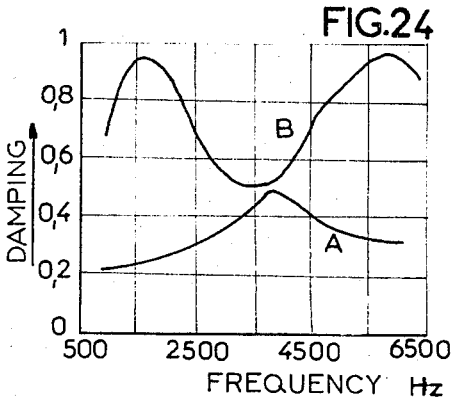
Figure 24A:
Figure 24B:
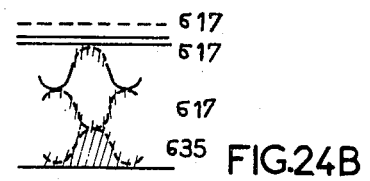
Figure 25:
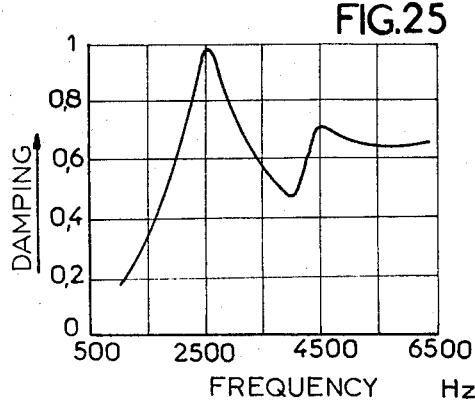
Figure 25A:
Figure 26:
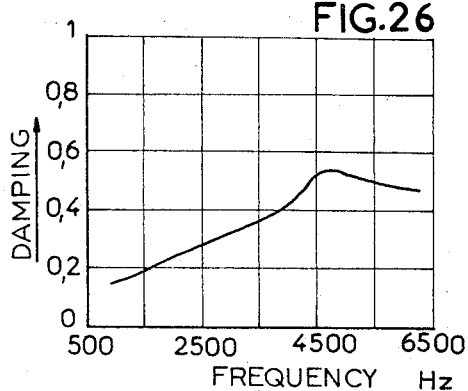
Figure 26A:
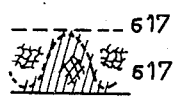

FIG. 15 is a chart showing the noise attenuation pattern in a given duct of the type in FIG. 8, over a wide frequency spectrum, respectively with and without cooling; and FIGS. 16, $16_A$, $16_B$, $16_C$, 17, $17_A$, $17_B$, $17_C$, 18, $18_A$, $18_B$, $18_C$, 19, $19_A$, 20, $20_A$, 21, $21_A$, $21_B$, 22, $22_A$, $22_B$, $22_C$, 23, $23_A$, $23_B$, 24, $24_A$, $24_B$, 25, $25_A$, 26 and $26_A$ show, on the one hand, cross-sections of different possible combinations of corrugated elements with skin sheets and absorbent fabrics or substances and, on the other, the corresponding sound attenuation plots obtained with a Kundt tube (without flow).

Figure 3:
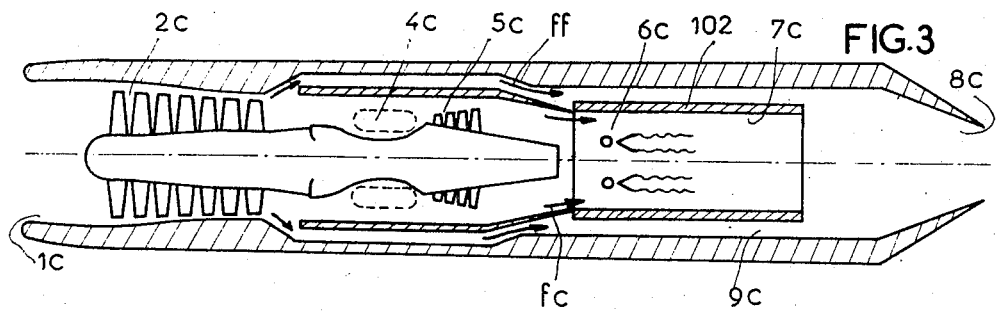
FIG. 3 is a schematic longitudinal sectional view of a turbojet of the single-flow kind with upstream by-passing.
Figure 4:
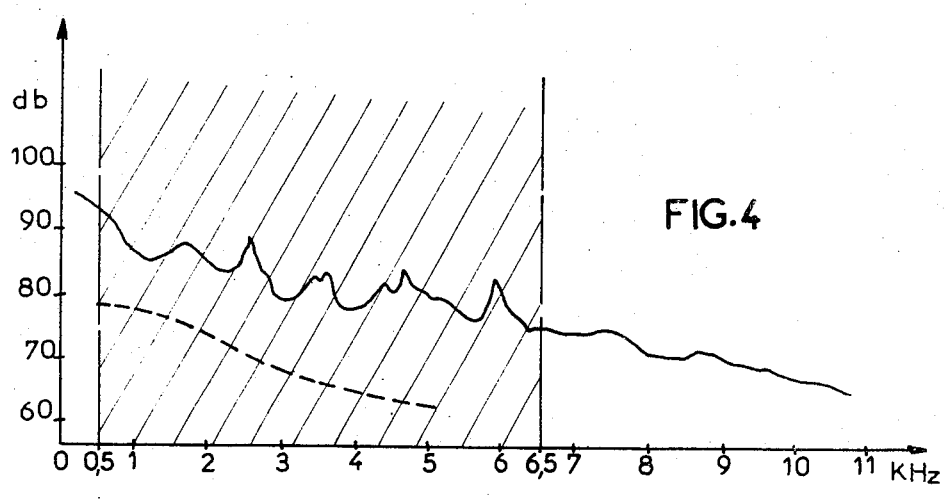
FIG. 4 is a chart showing the frequency spectrum of the noise emitted in a given type of turbojet duct, such as in a single-flow turbojet, the noise produced by the jet alone being represented by a dash-line.

In the first place, turbojets, whether of the single-flow (FIGS. 2–3) or by-pass flow (FIG. 1) type, are generators of noise in the exhaust duct, the frequency plotted against the intensity of which can usually be represented by the solid curve in FIG. 4, it being remembered that the dash-line curve represents the noise produced by the jet alone.

Figure 1:
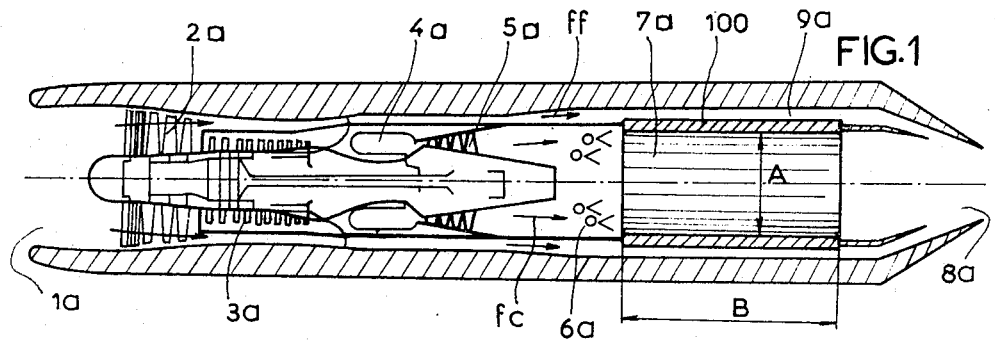
FIG. 1 is a schematic longitudinal sectional view of a turbojet of the by-pass kind.
Figure 2:
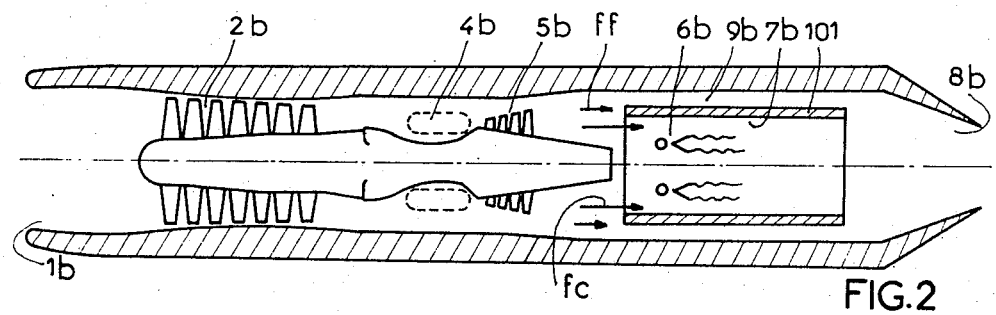
FIG. 2 is a schematic longitudinal sectional view of a turbojet of the single-flow kind.

For greater clarity in the description of the invention and in FIGS. 1, 2 and 3 of the accompanying drawings, the reference numerals therein are followed by the suffix letter a in respect of FIG. 1, the suffix letter b in respect of FIG. 2 and the suffix letter c in respect of FIG. 3.

It should be noted that noise is generated mainly by different portions of the turbojet, and in particular by the air intake 1a, 1b and 1c, the fan or low-pressure (LP) compressor 2a, 2b and 2c, the high-pressure (HP) compressor 3a, the combustion chambers 4a, 4b and 4c, the turbine 5a, 5b and 5c, the afterburner injectors 6a, 6b and 6c, the exhaust duct 7a, 7b and 7c surrounding the afterburner chamber and defining the primary-flow duct, the nozzle 8a, 8b and 8c, and the by-pass flow duct 9a, 9b and 9c. The problem therefore consists in so treating this exhaust duct as to maximize the noise attenuation therein.

In the present description, the noise damping materials used for devising an exhaust duct according to this invention are defined, on the one hand, for the 0.5–6.5 kHz frequency band corresponding to the shaded portion of FIG. 4 and seemingly of maximum interest from the practical standpoint and, on the other, for a temperature of 1,600°K, which would appear to be an average operating temperature.

Figure 5:
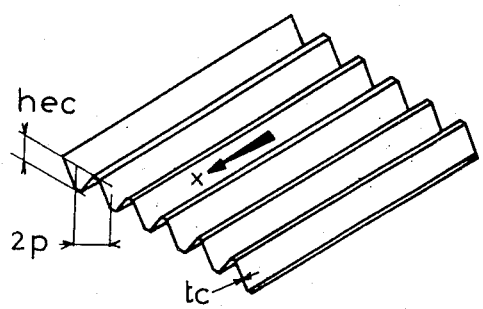
FIG. 5 is a perspective portrayal of part of a corrugated core element of the type used herein.
Figure 6:
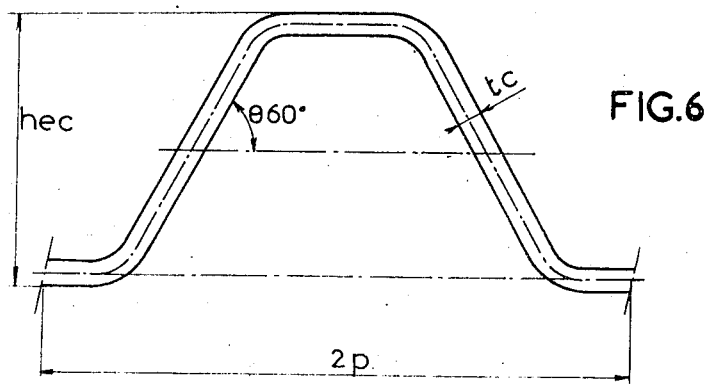
FIG. 6 is a cross-sectional view on an enlarged scale of one of the corrugations of the element in FIG. 5.

Further, the corrugated core basic element which is used in this invention in combination with other elements to form noise attenuation and cooling chambers for an exhaust duct, and which is fragmentally illustrated in FIGS. 5 and 6, possesses from the outset certain physical properties which are summarized in the table below, in which:

$hec$ is the corrugation depth,
$tc$ is the corrugation thickness,
$2p$ is the corrugation pitch,
$\theta$ is the bending angle,
$Acx$ is the equivalent tension/compression thickness which would be required for a flat sheet, the tensile/compressive force being assumed exerted in the direction of arrow X along the corrugations,
$Acc$ is the equivalent shear thickness required for a flat sheet having an identical behaviour in plane shear,
$Ics$ is the natural bending inertia in the direction of arrow X per unit width of plain corrugated core,
$Icd$ is the natural bending inertia in the direction of arrow X, per unit width of twin corrugated cores bonded corrugation-to-corrugation.

3), and also cooling chambers 13 when it is laid beneath a non-perforated annular sheet 14 forming the outer wall of the duct for the cool flow $ff$ (see also FIGS. 1, 2 and 3) issuing either from the low-pressure compressor, the rear part of the turbine ahead of the afterburner section, or from the exterior.

In a second fundamental form of embodiment illustrated in FIG. 8, the corrugated element 15 is annular and provides noise attenuation chambers 16 when it is laid on a perforated annular sheet 17 forming the inner wall of the duct for the hot flow $fc$, but in this case the cooling chambers 19 are formed by the spaces between corrugated element 15 and the non-perforated annular sheet 18 which thus constitutes the outer wall of the cool flow $ff$. Although such spaces can be obtained by any appropriate conventional means, FIG. 8 shows a convenient arrangement in which a number of corrugations 15a of corrugated element 15 have been deepened in order to provide adequate spacing from wall 18.

Figure 7:
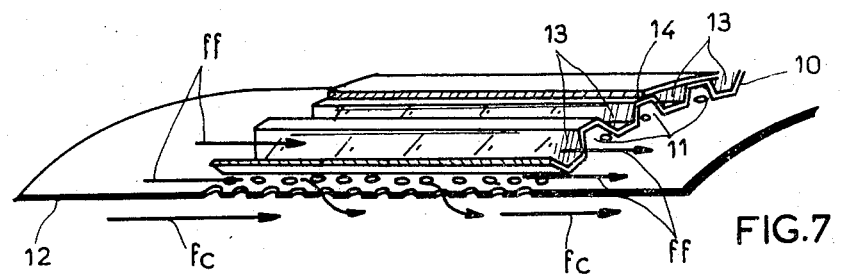
FIGS. 7 through 10 are partial perspective showings of possible combinations of a corrugated-core element sandwiched between a solid sheet and a perforated sheet whereby to form turbojet noise attenuation and cooling chambers.

As shown in FIGS. 7 and 8, part of the cool flow $ff$ passes freely through the perforations in order to produce a measure of wall cooling without thereby affecting the noise damping function of the noise attenuation chambers.

Figure 9:
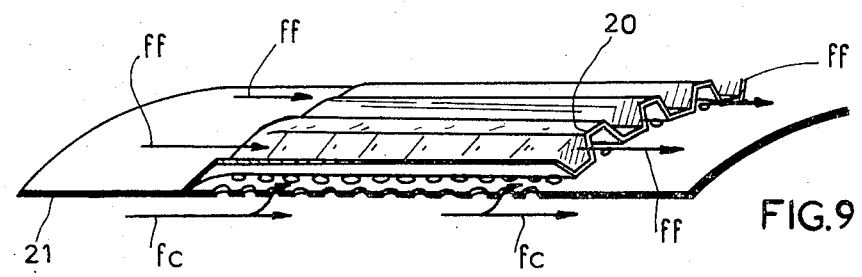

In a third form of embodiment which may be an alternative to the two above-described embodiments and which is shown in FIG. 9, the corrugated element 20 is blanked off at its upstream end whereby to form noise attenuation chambers jointly with the annular perforated sheet 21.

Figure 10:
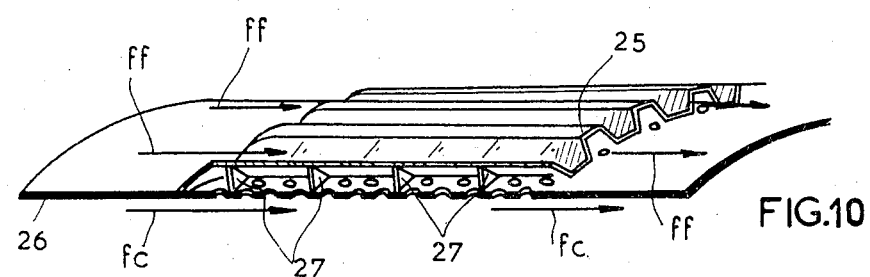

In a fourth form of embodiment which may likewise be a variant on the above-described embodiments and which is shown in FIG. 10, corrugated element 25 is likewise blanked off at its upstream end whereby to form closed noise attenuation chambers jointly with perforated annular sheet 26, partition walls being provided in said chambers.

In the case of FIGS. 9 and 10, the cool flow $ff$ no longer helps to cool the wall directly but operates directly on the noise attenuation chamber by heat conduction.

The essential noise damping characteristic of such

| Sandwich Structure With Corrugated Core (Standardized) | | | | | | | |
|---|---|---|---|---|---|---|---|
| $hec$ mm | $tc$ mm | $2p$ mm | $Acx$ mm | $Acc$ mm | $Ics$ mm$^3$ | $Icd$ mm$^3$ | $\theta$ |
| 2.3 | 0.10 | 4.00 | 0.17 | 0.06 | 0.10 | 0.65 ) | |
| 3.7 | 0.15 | 6.00 | 0.25 | 0.09 | 0.36 | 2.43 ) | |
| 6.7 | 0.20 | 12.50 | 0.31 | 0.13 | 1.56 | 10.10 ) | 60° |
| 6.8 | 0.30 | 12.50 | 0.47 | 0.19 | 2.34 | 15.46 ) | |
| 9.6 | 0.30 | 17.60 | 0.48 | 0.19 | 5.09 | 32.22 ) | |
| 9.7 | 0.40 | 17.60 | 0.64 | 0.25 | 6.79 | 43.58 ) | |
| 15.0 | 0.30 | 25 | 0.507 | 0.177 | 13.18 | 83.42 ) | |
| | | | | | | | 65° |
| 25.0 | 0.40 | 40 | 0.691 | 0.231 | 49.32 | 314.84 ) | to |
| 40.0 | 0.50 | 60 | 0.894 | 0.279 | 158.01 | 1000.00) | 70° |

The manner in which such a corrugated element can be adapted as a cooling and noise attenuation material will now be shown with reference to FIGS. 7 through 14 in the accompanying drawings.

In a first fundamental form of embodiment, shown in FIG. 7, the corrugated element 10 is annular and provides noise attenuation chambers 11 when it is laid on a perforated annular sheet 12 forming the inner wall of the duct containing hot-flow $fc$ (see also FIGS. 1, 2 and noise attenuation chambers is obtained by applying the classic principle of the Helmhotz resonator which, depending on the frequencies to be damped, allows dimensioning the chambers by appropriated choices of the profile and the perforation factor $\sigma$, in association or not with additional absorption materials.

Further, by reason of its evolutional geometry, the corrugated element is characterized by resonance law which is broader than that of more conventionally configured chambers such as rectangular chambers, for example.

Figure 14:
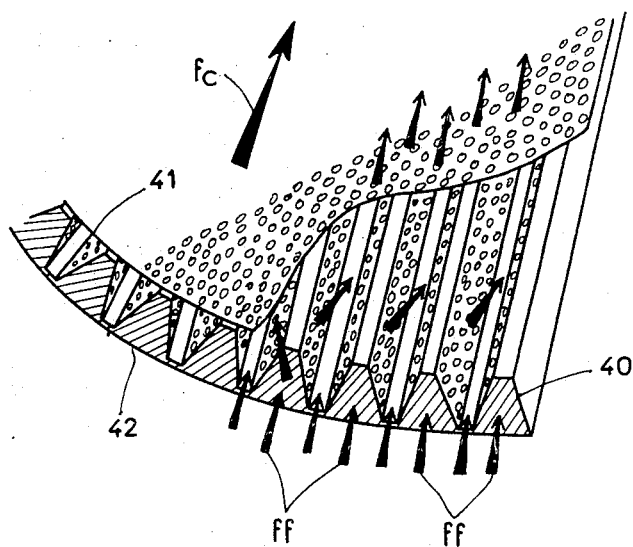
FIG. 14 is a fragmental perspective view of an alternative embodiment with perforated core corrugations.

A fifth form of embodiment shown in FIG. 14 consists in perforating the sides of the corrugations in the corrugated element. In this embodiment, the corrugated element 40 is placed between perforated and non-perforated sheets 41 and 42, respectively, and the wholly or partly perforated corrugation sides permit interaction between the aerodynamic and acoustic domains, and the cooling air $ff$ which "sweats" on the inner duct wall provides effective thermal protection against the hot gases in the flow $fc$. It should be noted that, for greater clarity, the cooling chambers are shaded in on all the figures in the accompanying drawings.

Figure 13:
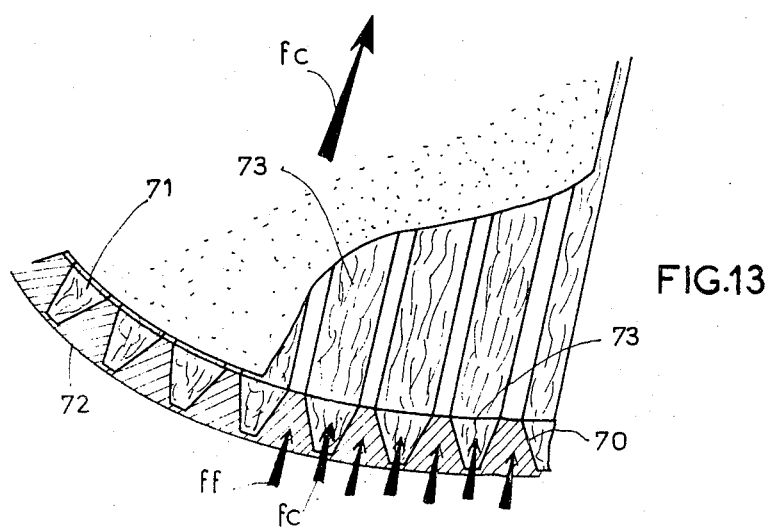

In a last form of embodiment shown in FIG. 13, the corrugated element 70 is sandwiched between a perforated sheet 71 and a non-perforated sheet 72 and is filled, in accordance with a noise attenuation chamber forming pattern, with fibrous material 73 of the metal-wool variety, for example.

Figure 11:
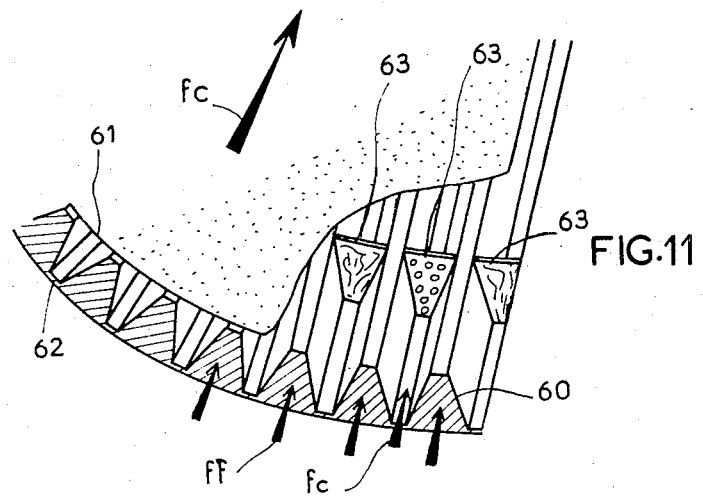
FIGS. 11, 12 and 13 are fragmental perspective showings of a variant on the noise attenuation chambers with internal partitions or fibrous substances.
Figure 12:
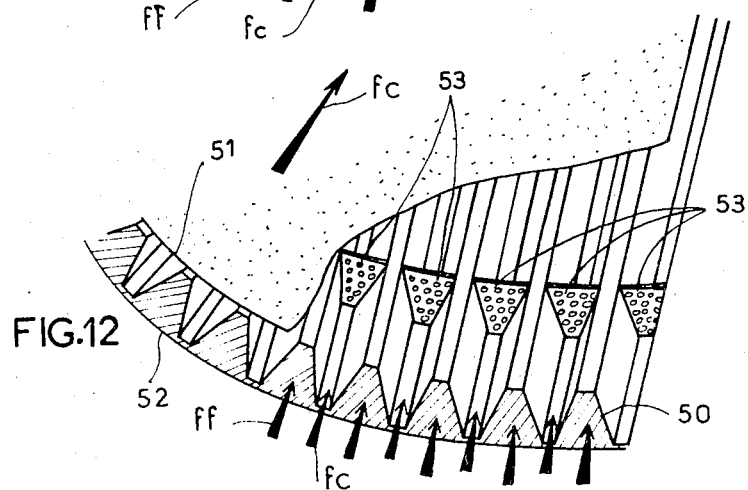

By way of an alternative to the form of embodiment described with reference to FIG. 10, FIGS. 11 and 12 illustrate instances in which the noise attenuation chamber walls are perforated. This necessity may arise in cases where it is desirable to cause a small part of the flow to pass from one partitioned noise attenuation chamber to another.

In FIG. 12, corrugated element 50 is sandwiched between a perforated sheet 51 and a non-perforated sheet 52 and is provided with perforated partition walls 53 the extent of perforation of which is determined according to the flow fraction to be passed through.

In FIG. 11, the corrugated element 60 is sandwiched between a perforated sheet 61 and a non-perforated sheet 62 and provided with alternately perforated and non-perforated partition walls 63 in order to restrain the flow fraction passing through the corrugations.

The partitioning of the noise attenuation chambers stem from the need to reduce the resonance volume for specific frequencies determined according to how the Helmhotz resonator is applied.

Because of the difficulty experienced by the applicants in establishing a general absorption law for all cases of utilization of a corrugated element in combination with other materials, noise damping curves were plotted in FIGS. 16 through 26, on the basis of laboratory measurements and for frequencies between 500 Hz and 6,500 Hz, for the different associations of elements shown in the correspondingly referenced figures designated by the suffix letter A, B or C.

For greater clarity in reading the latter-mentioned figures, reference should be had to the following table which sets out the various constituent elements of the combinations. The figures also show the perforation factor $\sigma$ and, where applicable, the number of fabric layers, which number is indicated in all relevant instances on the corresponding noise damping curves in FIGS. 16 through 26.

| Combination | 16A | 16B | 16C | 17A | 17B | 17C | 18A | 18B | 18C | 19A | 20A | 21A | 21B | 22A | 22B | 22C | 23A | 23B | 24A | 24B | 25A | 26A |
|---|---|---|---|---|---|---|---|---|---|---|---|---|---|---|---|---|---|---|---|---|---|---|
| 1° Plain corrugated element. | X | X | X | | | | | | | | X | | | | | | | | | | X | |
| Perforated corrugated element. | | | | X | X | X | X | X | X | X | | X | | X | X | X | X | X | X | X | | X |
| 2° Plain corrugated element. | | | | | | | | | | X | X | | | X | X | X | | | | | | |
| Perforated corrugated element. | | | | | | | | | | X | | X | | | | | X | X | X | X | | |
| 3° Plain corrugated element. | | | | | | | | | | X | | | | | | | | | | | | |
| Perforated corrugated element. | | | | | | | | | | | | | | | | | | | | | X | |
| 1 Perforated sheet. | X | X | X | X | X | X | X | X | X | X | X | X | X | X | X | X | X | X | X | X | X | X |
| 2 Perforated sheets. | | | | | | | | | | | | | X | | | | | | | | | |
| Fabrics. | X | X | X | X | | X | X | | | X | | | X | X | | X | X | | X | | X | |
| Damping element. | | | | | | | | | | | | | | | | | | | | | X | X |

Considering all the possible combinations based on one or more perforated or non-perforated corrugated elements associated to perforated or non-perforated sheets, perforated or non-perforated partition walls, metal fabrics, or fibrous absorbent elements for the purpose of forming noise attenuation and cooling chambers, it is clear that the number of new products obtainable thereby may be considerable and easily exceed one thousand.

In this regard, it should be noted that the feature common to all these new products is the basic corrugated element which, when its corrugations are arranged longitudinally, is capable of forming noise attenuation and cooling chambers for turbojet exhaust ducts.

The exceptional mechanical strength of these new products under the thermal stresses set up in the exhaust duct is due to the intrinsic properties of the corrugated element which, by virtue of its carefully designed profile, endows the compound structure with maximum rigidity under bending loads.

Further, all these products possess excellent resistance to acoustic fatigue even at high noise levels in excess of 160 dB.

By now a first non-limitative example, a turbojet exhaust duct according to this invention, of the type designated by reference numeral 100 in FIG. 1 and having a diameter A of 1,000mm, a length B of 1,500mm and fabricated from a corrugated element in refractory alloy with a corrugation depth of 25mm and fusion-welded between an 0.4mm-thick perforated refractory alloy sheet with a perforation factor $\sigma = 17$ and an 0.4 mm-thick plain refractory alloy sheet with one or more interposed metal fabric ($n = 20$), in accordance with FIG. 16C, possesses the ability, coupled with excellent mechanical strength, of damping noise within the frequency spectrum shown in FIG. 16, at a duty temperature of 1,600°K.

By way of a second non-limitative example, in the case of operating conditions involving the flow rate of 180 meters per second, an exhaust duct such as the one designated by reference numeral 101 in FIG. 2 or 102 in FIG. 3, of comparable dimensions, is capable, in a configuration similar to that shown in FIG. 8 in which $c$ is close to 2mm, of damping noise to the extent shown in the graph in FIG. 15, in which the solid-line plot refers to conditions without cooling and the dash-line plot refers to conditions with cooling. Reference to FIG. 15 shows in particular that cooling has little effect on the noise attenuation curve, the attenuation being high in the relatively high frequency range.

Obviously, the present invention is by no means limited to the forms of embodiment and the examples described hereinabove, since the considerable number of combinations made possible by the use of the corrugated sandwich structure core in association with other elements can only be broadly indicated herein.

Likewise, the exhaust duct can be configured as a one-piece cylinder or as a cylinder or cone frustum of the well known "film cooled" type, or else as a cone frustum opening out towards the rear end of the nozzle or towards the cold-flow intake.

It goes without saying, however, that the basic characteristic of the present invention, to wit the devising of an exhaust duct with noise attenuation and cooling chambers formed with a sandwich structure with a corrugated core as the basic element, includes in its scope all instances in which said structure is employed under similar conditions.

We claim:

1. An exhaust duct inside which flows a hot turbojet flow and outside which flows a cooler turbojet flow, comprising in combination: at least one non-perforated external annular sheet; at least one perforated internal annular sheet; and a longitudinally corrugated element positioned between said external and internal annular sheets, noise attenuation chambers communicating with said hot flow being bounded by said perforated internal sheet and said corrugated element and cooling chambers communicating with said cooler flow being bounded by non-perforated external sheet and said corrugated element.

2. An exhaust duct as claimed in claim 1, in which said noise attenuation chambers are blanked off at their upstream ends.

3. An exhaust duct as claimed in claim 1, in which said corrugated element is perforated.

4. An exhaust duct as claimed in claim 1, in which transverse partition walls are provided in said sound attenuation chambers.

5. An exhaust duct as claimed in claim 4, in which said transverse partition walls are perforated.

6. An exhaust duct as claimed in claim 1, in which a fibrous substance fills said noise attenuation chambers.

7. An exhaust duct as claimed in claim 1, in which at least one layer of fabric is provided against said internal perforated sheet.

8. An exhaust duct as claimed in claim 1, in which at least one complementary corrugated element is provided, corrugation against corrugation, between said longitudinally corrugated element and said non-perforated external sheet.

9. An exhaust duct as claimed in claim 1, in which the corrugations of said longitudinally corrugated element are substantially parallel to the axis of said duct.

10. An exhaust duct as claimed in claim 1, in which said non-perforated external annular sheet is placed against the corrugated element.

11. An exhaust duct as claimed in claim 1, in which certain corrugations of said longitudinally corrugated element are deepened, said non-perforated external annular sheet being fixed to said corrugations.

12. An exhaust duct as claimed in claim 1, in which said longitudinally corrugated element comprises a refractory alloy sheet 0.4 mm thick, with a corrugation depth of 25 mm, layers of metal fabric being interposed between said corrugated element and said perforated internal annular sheet, noise being damped in the 0.5 to 6.5 kHz frequency band and the temperature being in the region of 1,600°K.

* * * * *